(12) United States Patent
Zameroski et al.

(10) Patent No.: US 10,899,462 B2
(45) Date of Patent: Jan. 26, 2021

(54) ANTI-TORQUE AFT-MOUNTING SYSTEMS, DEVICES, AND METHODS FOR TURBOPROP/TURBOSHAFT ENGINES

(71) Applicant: LORD Corporation, Cary, NC (US)

(72) Inventors: Daniel Zameroski, McKean, PA (US); Gerald Whiteford, Waterford, PA (US)

(73) Assignee: Lord Corporation, Cleveland, OH (US)

( * ) Notice: Subject to any disclaimer, the term of this patent is extended or adjusted under 35 U.S.C. 154(b) by 361 days.

(21) Appl. No.: 15/752,484

(22) PCT Filed: Aug. 31, 2016

(86) PCT No.: PCT/US2016/049557
§ 371 (c)(1),
(2) Date: Feb. 13, 2018

(87) PCT Pub. No.: WO2017/040565
PCT Pub. Date: Mar. 9, 2017

(65) Prior Publication Data
US 2019/0009918 A1 Jan. 10, 2019

Related U.S. Application Data

(60) Provisional application No. 62/214,481, filed on Sep. 4, 2015.

(51) Int. Cl.
*B64D 27/26* (2006.01)
*F16F 9/10* (2006.01)

(52) U.S. Cl.
CPC ........ *B64D 27/26* (2013.01); *B64D 2027/262* (2013.01); *B64D 2027/264* (2013.01); *B64D 2027/266* (2013.01); *F16F 9/10* (2013.01)

(58) Field of Classification Search
CPC ........ B64D 27/10; B64D 27/12; B64D 27/14; B64D 27/16; B64D 27/18; B64D 27/20; B64D 27/26; B64D 2027/262; B64D 2027/264; B64D 2027/266; B64D 2041/002
See application file for complete search history.

(56) References Cited

U.S. PATENT DOCUMENTS

| | | | | |
|---|---|---|---|---|
| 2,936,978 | A * | 5/1960 | Lauck | B64D 27/12 248/555 |
| 5,127,607 | A * | 7/1992 | McGuire | B60K 5/1216 244/54 |
| 5,806,792 | A * | 9/1998 | Brossier | B64D 27/18 244/54 |
| 5,918,833 | A | 7/1999 | Najand et al. | |
| 2011/0168837 | A1 | 7/2011 | Balk et al. | |
| 2012/0085859 | A1 | 4/2012 | Barnes et al. | |
| 2013/0099051 | A1 | 4/2013 | Bellabal et al. | |
| 2015/0175268 | A1 | 6/2015 | Guillou | |

* cited by examiner

*Primary Examiner* — Nicholas McFall

(57) ABSTRACT

Aft-mounting systems, devices, and methods for turboprop and turboshaft engines include two or more coupling elements 201, 211, 221 that are configured to couple an aft portion of an engine of an aircraft to a support structure of the aircraft. The two or more coupling elements are together configured to react forces generated in a vertical direction and in a lateral direction transverse to the engine but allow substantially unrestricted rotation of the engine with respect to the support structure about an axis of rotation of the engine.

17 Claims, 5 Drawing Sheets

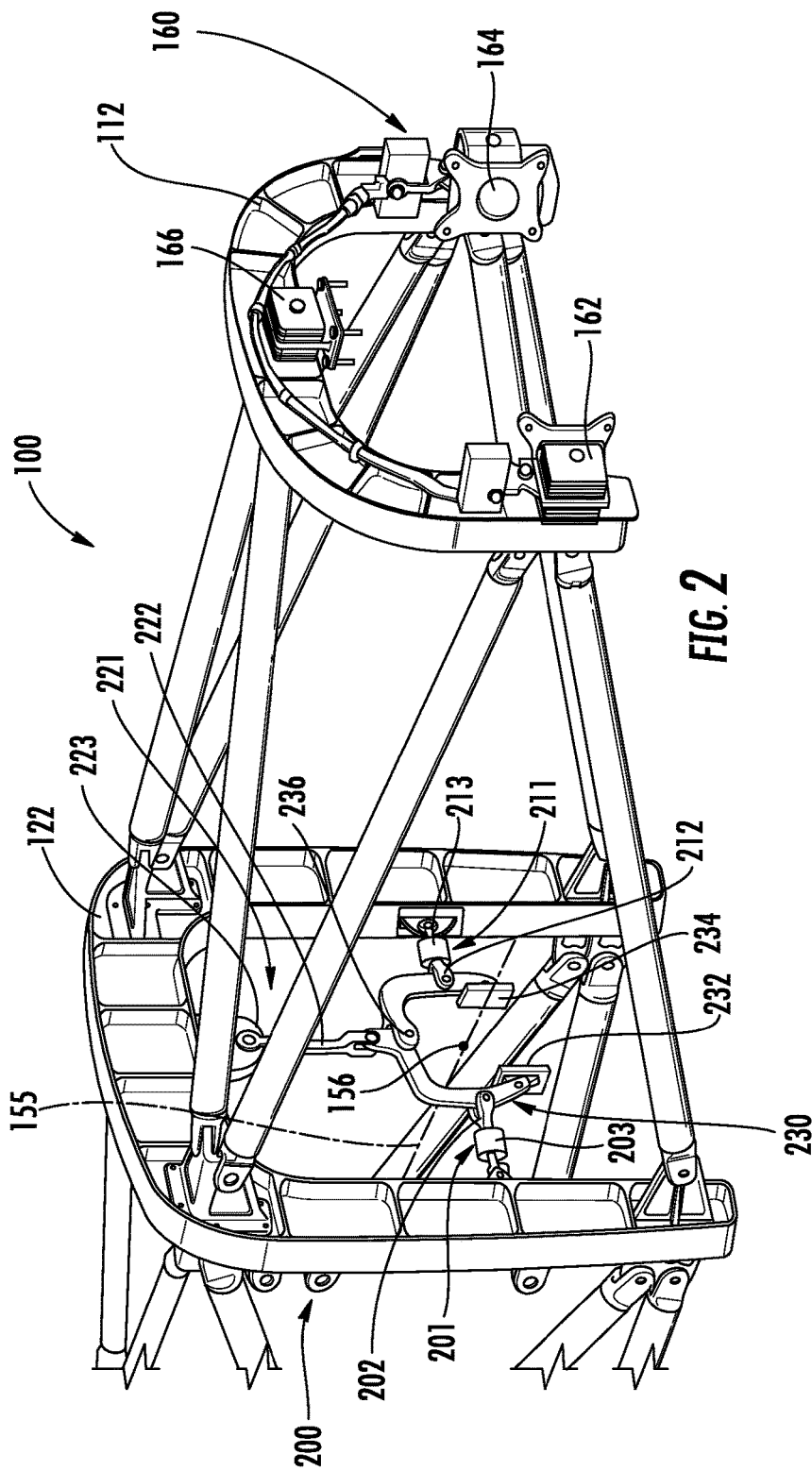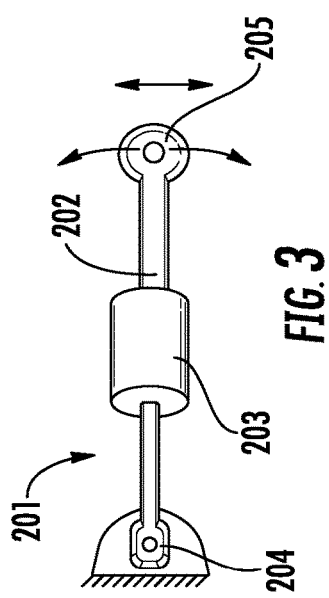

ANTI-TORQUE AFT-MOUNTING SYSTEMS, DEVICES, AND METHODS FOR TURBOPROP/TURBOSHAFT ENGINES

CROSS-REFERENCE TO RELATED APPLICATIONS

The present application claims the benefit of U.S. Patent Application Ser. No. 62/214,481, filed Sep. 4, 2015, the disclosure of which is incorporated herein by reference in its entirety.

FIELD OF INVENTION

The subject matter disclosed herein generally relates to the design and operation of an engine mount. In particular, the subject matter relates to aft-mounting systems, devices, and methods for turboprop and turboshaft engines.

BACKGROUND

In multi-plane support of aircraft turboprop and turboshaft engines, it is generally desirable to restrict as much of the engine torque reaction as possible to one of the attachment planes (e.g., station locations). This restriction prevents an otherwise shared torque reaction, which may causing twisting moments within the engine/propulsion system. This twisting of the engine may overly stress the engine or cause internal loads, which can lead to performance loss. In this regard, in many applications, engine manufacturers specify limits on torque reaction at various mounting planes. (e.g., 85% of torque reaction must be at a forward plane).

Traditionally, this torque split has been achieved by incorporating isolation systems with appropriate high and low stiffness at the various mounting planes. In some cases where the supporting airframe structure (e.g., truss) is not stiff enough to provide adequate support of a stiff isolator, however, that structure may dominate the overall flexibility of the installation. In these cases, it may not be possible to achieve the desired torque split (e.g., 85% or more) using conventional mounts.

SUMMARY

In one aspect, an engine mount device is provided. The engine mount device includes two or more coupling elements configured to couple an aft portion of an engine of an aircraft to a support structure of the aircraft. The two or more coupling elements are together configured to react forces generated in a vertical direction and in a lateral direction transverse to the engine (e.g., a force balance of the system is achieved by reaction forces applied by the support structure), but the two or more coupling elements are further configured to allow substantially unrestricted rotation of the engine with respect to the support structure about an axis of rotation of the engine.

In another aspect, an engine mount system configured to couple an engine of an aircraft to a support structure of the aircraft is provided. The engine mount system includes a forward mount comprising two or more forward coupling elements configured to couple a forward portion of an engine of an aircraft to a support structure of the aircraft and an aft mount comprising two or more aft coupling elements configured to couple an aft portion of the engine to the support structure, wherein the two or more coupling elements are configured to allow substantially unrestricted rotation of the engine with respect to the support structure about an axis of rotation of the engine. In this configuration, the forward mount is configured to react greater than 85% of torque generated by the engine.

In yet a further aspect, a method for coupling an aft portion of an engine of an aircraft to a support structure of the aircraft is provided. The method includes coupling two or more coupling elements between an aft portion of an engine of an aircraft and a support structure of the aircraft, wherein the two or more coupling elements are together configured to react forces generated in a vertical direction and in a lateral direction transverse to the engine, and wherein the two or more coupling elements are configured to allow substantially unrestricted rotation of the engine with respect to the support structure about an axis of rotation of the engine.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

FIG. 2 is a perspective view of an engine mounting system according to an embodiment of the presently disclosed subject matter.

FIG. 3 is a side perspective view of a strut arrangement for use with an engine mounting system according to an embodiment of the presently disclosed subject matter.

DETAILED DESCRIPTION

The presently disclosed subject matter addresses the problems encountered in conventional engine mounts by introducing systems, devices, and methods of attachment at any number of attachments planes. These systems, devices, and methods of attachment provide a support that provides a very low or insignificant torque reaction while still providing translational stiffness for the engine support. In some embodiments, this support is provided using mechanical components (e.g., a series of linkages) and/or fluidic components to provide freedom to the torsional degree of freedom. In essence, the configuration of such systems, devices, and methods of attachment is the inverse of a torque-restraining system. As a result, the present systems, devices, and methods prevent reaction of torque at one or more of the mounting planes, regardless of the stiffness of the underlying airframe or structure.

Figure 1:
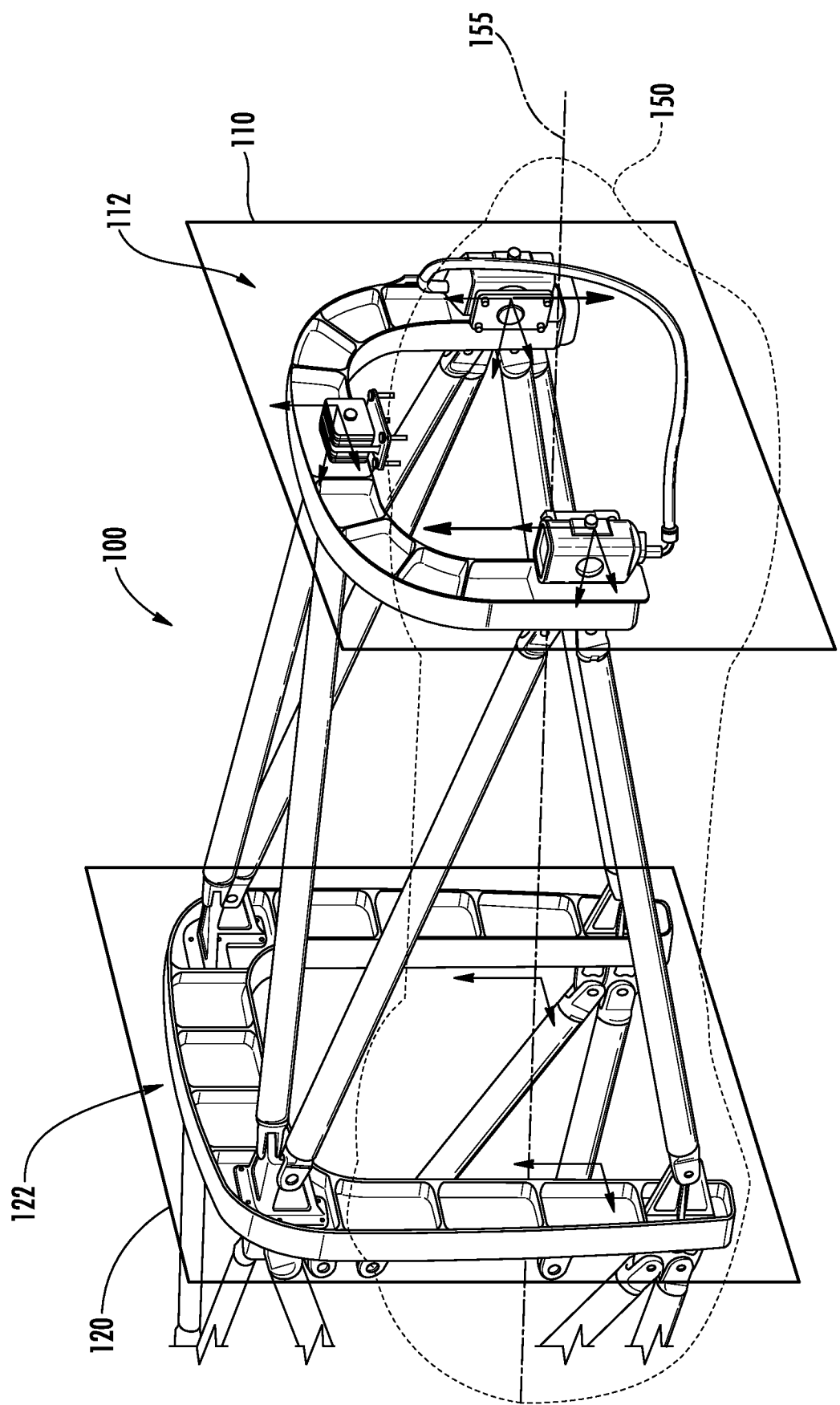
FIG. 1 is a perspective view of a support structure with which engine mounting systems are coupled according to embodiments of the presently disclosed subject matter.

Referring to FIGS. 1-7, embodiments of the present systems, devices, and methods are illustrated. Referring to FIG. 1, an exemplary configuration for an aircraft support structure, generally designated 100, for supporting an engine is shown. In this configuration, support structure 100 includes a truss structure that defines a first, forward mounting plane 110 and a second, aft mounting plane 120 at which an engine can be coupled to support structure 100. Although FIG. 1 illustrates two mounting planes, those having skill in the art will recognize that the concepts discussed herein can be extended to any number N of support planes, where N−1 of the reaction planes are configured to provide minimum contributions to torque resistance. In some embodiments, support structure 100 includes a forward collar 112 at forward mounting plane 110 and an aft collar 122 at aft mounting plane 120. Within this framework, engine mounting systems, devices, and methods according to the present subject matter are configured to support an engine, shown schematically at 150 in FIG. 1 using dotted lines, on support structure 100 via attachment to forward collar 112 and aft collar 122. In some embodiments, such a configuration for support structure 100 is appropriate for supporting an engine 150 in a class configured to generate about 2000 to about 5000 horsepower (hp) (about 1491 kilowatts to about 3729 kilowatts) of thrust, although those having ordinary skill in the art will recognize that the concepts disclosed herein are equally applicable to engines having other sizes and configurations.

A forward mount system 160 is provided at forward collar 112. In some embodiments, such as those illustrated in FIGS. 2, 4, 5, and 6, forward mount system 160 includes a first side attachment 162, a second side attachment 164, and an upper attachment 166 that are together configured to react loads (e.g., to keep load balance in equilibrium) in the vertical and lateral directions (e.g., perpendicular to a longitudinal axis of engine 150), to react loads in a longitudinal direction parallel to the longitudinal axis of engine 150 (e.g., thrust loads), and to react moments about an axis of rotation 155. In the illustrated embodiments, first and second side attachments 162 and 164 are elements that are fluidicly interconnected as part of a fluid torque restraint system configured to react differential loads on either side of engine 150, such as those generated by torsion. Alternatively, although not illustrated in the figures, any of a variety of configurations known in the art can be used for forward mount system 160 as long as it is configured to react all or most of the torque generated by engine 150 at forward mounting plane 110. (e.g., greater than 85% of the torque reaction acting at forward mounting plane 110)

In addition, an aft mount system 200 is provided at aft collar 122 and is configured to react forces generated in a vertical direction and in a lateral direction transverse to the engine but allows substantially unrestricted rotation of engine 150 with respect to support structure 100 about axis of rotation 155 of engine 150, at least within a limited angular range. Aft mount system 200 thus helps to provide pitch and yaw control for engine 150 relative to support structure 100 in combination with forward mount system 160 without reacting roll moments.

In some embodiments, aft mount system 200 includes two or more coupling elements that extend between aft collar 122 and engine 150 to couple an aft portion of engine 150 to support structure 100 and that are together configured to react forces generated in the vertical and lateral directions transverse to engine 150 but allow substantially unrestricted rotation of engine 150 with respect to support structure 100 about axis of rotation 155. Referring to the embodiment shown in FIG. 2, aft mount system 200 includes a first coupling element 201, a second coupling element 211, and a third coupling element 221. In some embodiments, the two or more coupling elements comprise two or more struts (e.g., metallic or elastomeric) configured to pivotably couple to support structure 100 and to the aft portion of engine 150, wherein each of the two or more struts is configured to pivot in response to twisting of engine 150 about axis of rotation 155.

In the embodiment illustrated in FIG. 2, first coupling element 201 includes a first strut 202, second coupling element 211 includes a second strut 212, and third coupling element 221 includes a third strut 222, each of which extend from positions spaced about aft collar 122. In the embodiment illustrated in FIG. 3, first strut 202 includes a first fixed pivot 204 that is configured to pivotably attach to aft collar 122 and a first engine pivot 205 that is configured to pivotably couple to engine 150. In some embodiments, second strut 212 and third strut 222 have substantially similar end configurations. When installed as shown in FIG. 2, first strut 202 is pivotably coupled to one side of aft collar 122 and extends towards a focal point 156 (e.g., a center of rotation and/or of torque-moment) located along axis of rotation 155 (e.g., where axis of rotation 155 intersects aft mounting plane 120) of engine 150, second strut 212 is pivotably coupled to an opposing side of aft collar 122 but likewise extends towards focal point 156, and third strut 222 extends from an upper portion of aft collar 122 towards focal point 156.

In some embodiments, one or more of the struts includes an elastomer section or other flexible element that is configured to accommodate a change of a length (e.g., an extension or contraction) of a respective one of the two or more struts when engine 150 is moved and/or rotated relative to support structure 100, to dampen engine vibration to provide a degree of vibrational isolation for support structure 100, and/or to otherwise allow some degree of predictable and/or limited compliance to loads in an axial direction of the respective strut. Referring to the embodiment illustrated in FIGS. 2 and 3, first strut 202 includes a first flexible element 203 in a body portion of first strut 202, first flexible element 203 having a defined spring constant K that is designed to allow a length of first strut 202 to change in a predictable manner in response to load and/or deflection of engine 150 in the lateral and/or vertical directions. In any configuration, the compliance provided by the flexible elements of the struts is used to control engine modes and to provide isolation of vibration from engine 150 to the aircraft. In some embodiments, the selection of a stiffness value for the flexible elements takes into account the engine and airframe stiffnesses, mass properties, and/or the operational speed environment for the engine/propeller.

In the embodiment illustrated in FIG. 2, second strut 212 has a similar structure, with a second flexible element 203 (e.g., an elastomer section) being provided in a body portion of second strut 212 to provide a desired compliance to lateral and/or vertical loads. In some embodiments, one or more of the coupling elements includes an elastomeric or other flexible element at the connection point of the coupling element to aft collar 122 and/or engine 150. In the embodiment illustrated in FIG. 2, third strut 222 includes a third flexible element 223 at an end of third strut 222 that is configured for pivotable coupling to aft collar 122. Those having ordinary skill in the art will recognize, however, that the embodiments illustrated are exemplary, and any of a variety of other configurations for one or more of first, second, and third struts 202, 212, and 222 are contemplated for use in aft mount system 200.

Regardless of the particular form of the coupling elements themselves, in some embodiments, each of first, second, and third coupling elements 201, 211, and 221 is pivotably coupled to engine 150 by way of an intermediate cradle 230 that is connected to engine 150 and provides static determinacy for aft mount system 200. Cradle 230 allows for coupling of the coupling elements at various angles with respect to engine 150 even when the available attachment locations to engine 150 are fixed (e.g., at lateral locations on engine 150). In some embodiments, cradle 230 allows for third coupling element 221 to react loads in the vertical direction while still being aligned to the center of rotation (e.g., aligned with focal point 156). Since many conventional engine designs do not include an engine attachment pad on a top surface of engine 150, such an arrangement would require modification to the design of engine 150 itself in the absence of cradle 230.

In the embodiment shown in FIG. 2, cradle 230 has a generally upside-down U-shaped form defined by first and second legs that are connected by a center portion, with a first attachment flange 232 provided at the terminal end of one leg and a second attachment flange 234 provided at the terminal end of the other leg of the U-shape for attachment to engine 150. In some embodiments, cradle 230 includes an expansion joint 236 at or near its center, which is configured to allow first attachment flange 232 and second attachment flange 234 to be movable with respect to one another to accommodate thermal expansion of the engine 150. In this configuration, first strut 202 is pivotably coupled to one leg of cradle 230 (e.g., near first attachment flange 232), second strut 212 is pivotably coupled to the other leg of cradle 230 (e.g., near second attachment flange 234), and third strut 222 is pivotably coupled to cradle 230 at or near its center portion (e.g., near expansion joint 236).

In the embodiment illustrated in FIG. 2, first, second, and third struts 202, 212, and 222 are configured to together react lateral and vertical loads generated between aft collar 122 and engine 150. In some embodiments, lateral loads are reacted primarily by first and second struts 202 and 212, whereas vertical loads are reacted primarily by third strut 222. With each of first, second, and third struts 202, 212, and 222 being arranged radially about engine 150 and oriented substantially along lines between one or more positions on support structure 100 and focal point 156, however, each of these coupling elements are configured to pivot in response to a torque load rather than reacting the torque load. In embodiments in which one or more of first, second, or third flexible element 203, 213, or 223 are provided, the lengths of first, second, and third struts 202, 212, and/or 222 are adaptable to accommodate such pivoting such that the struts provide little resistance to such rotation of engine 150. In this way, aft mount system 200 provides very low or insignificant reaction of moments about axis of rotation 155 and thus effectively decouples the roll-moment reaction capability from the vertical- and lateral-load reaction capabilities of support structure 100 at aft mounting plane 120.

Figure 4:
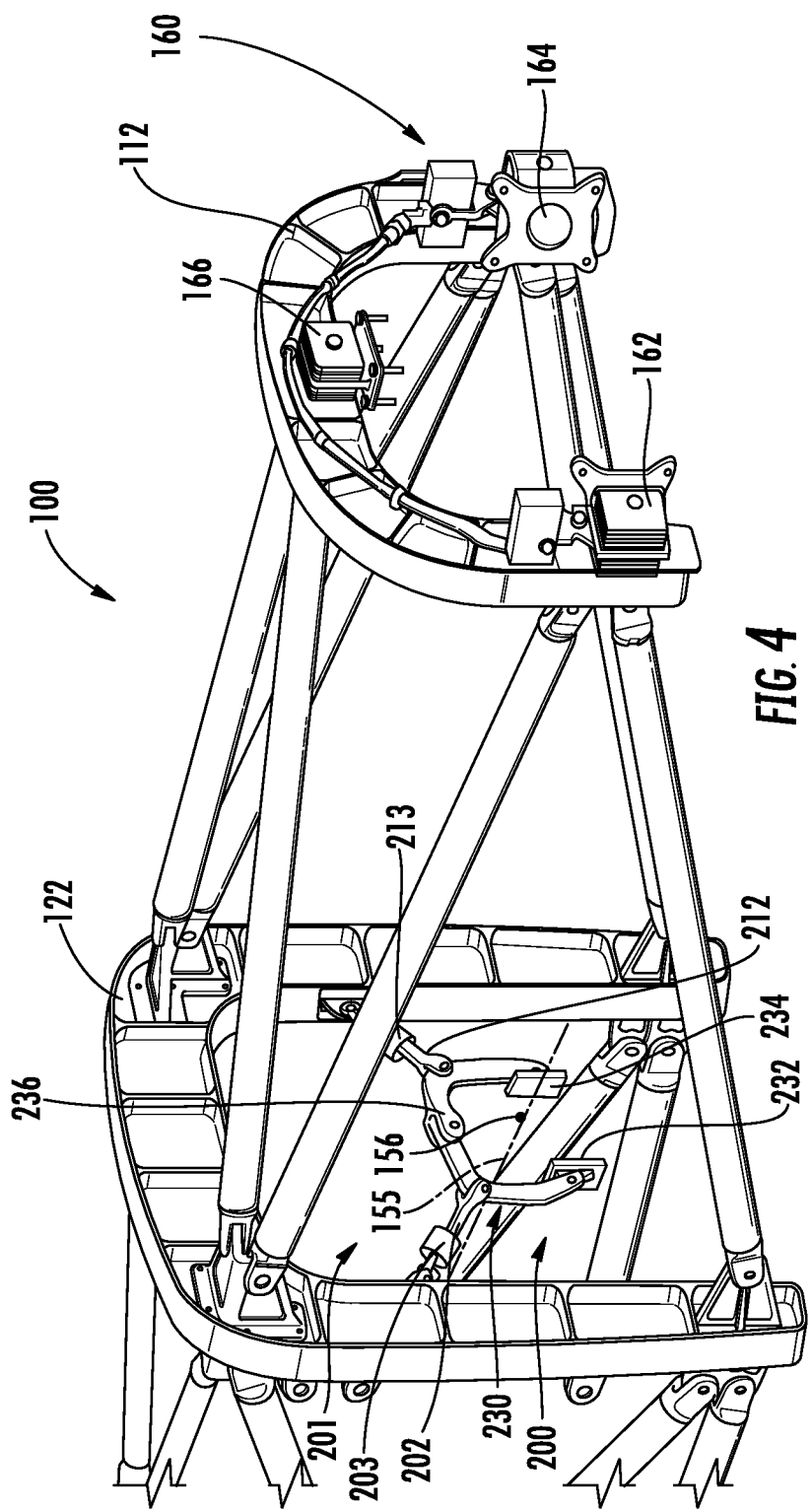
FIGS. 4 through 6 are perspective views of engine mounting systems according to embodiments of the presently disclosed subject matter.

In another embodiment illustrated in FIG. 4, only two coupling elements are provided for coupling the aft portion of engine 150 to aft collar 122. In this configuration, aft mount system 200 again includes a substantially U-shaped intermediate cradle 230 that is configured to couple to engine 150 (e.g., using first and second attachment flanges 232 and 234). First coupling element 201 comprises first strut 202, which is pivotably connected to both of one side of aft collar 122 and a first leg of cradle 230, and second coupling element 211 comprises second strut 212, which is pivotably connected to both of the other side of aft collar 122 and the second leg of cradle 230. Compared to the configuration illustrated and described with respect to FIG. 2, however, third coupling element 221 is omitted, thus the lateral and vertical loads are reacted by first and second coupling elements 201 and 211 only. In this arrangement, the angles at which first and second struts 202 and 212 are oriented with respect to axis of rotation 155 are different than in the embodiment illustrated in FIG. 2 to optimize the lateral- and vertical-load reactions among the two coupling elements. In some embodiments, the angles and/or stiffnesses of first and second struts 202 and 212 are selected based upon stiffnesses and/or mass properties of engine 150 and of support structure 100 to obtain a desired engine modal response (e.g., the ratio and magnitude of lateral and vertical stiffness being controlled by these elements), load distribution, and/or any required deflection. Even in this different orientation, however, first and second struts 202 and 212 are configured to pivot out of the way during a torque load and thus provide very low or insignificant reaction of moments about axis of rotation 155.

Figure 5:
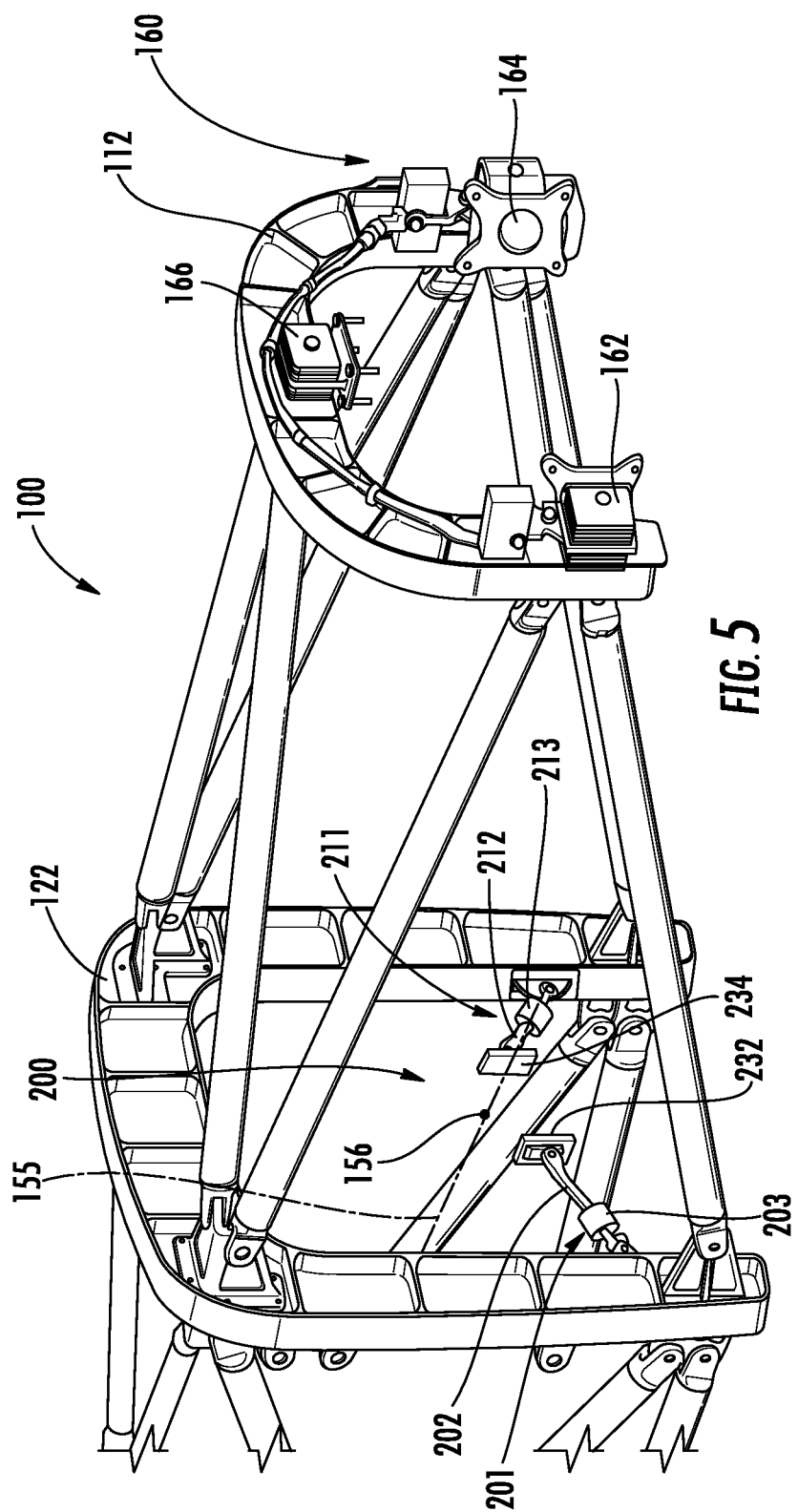
Figure 6:
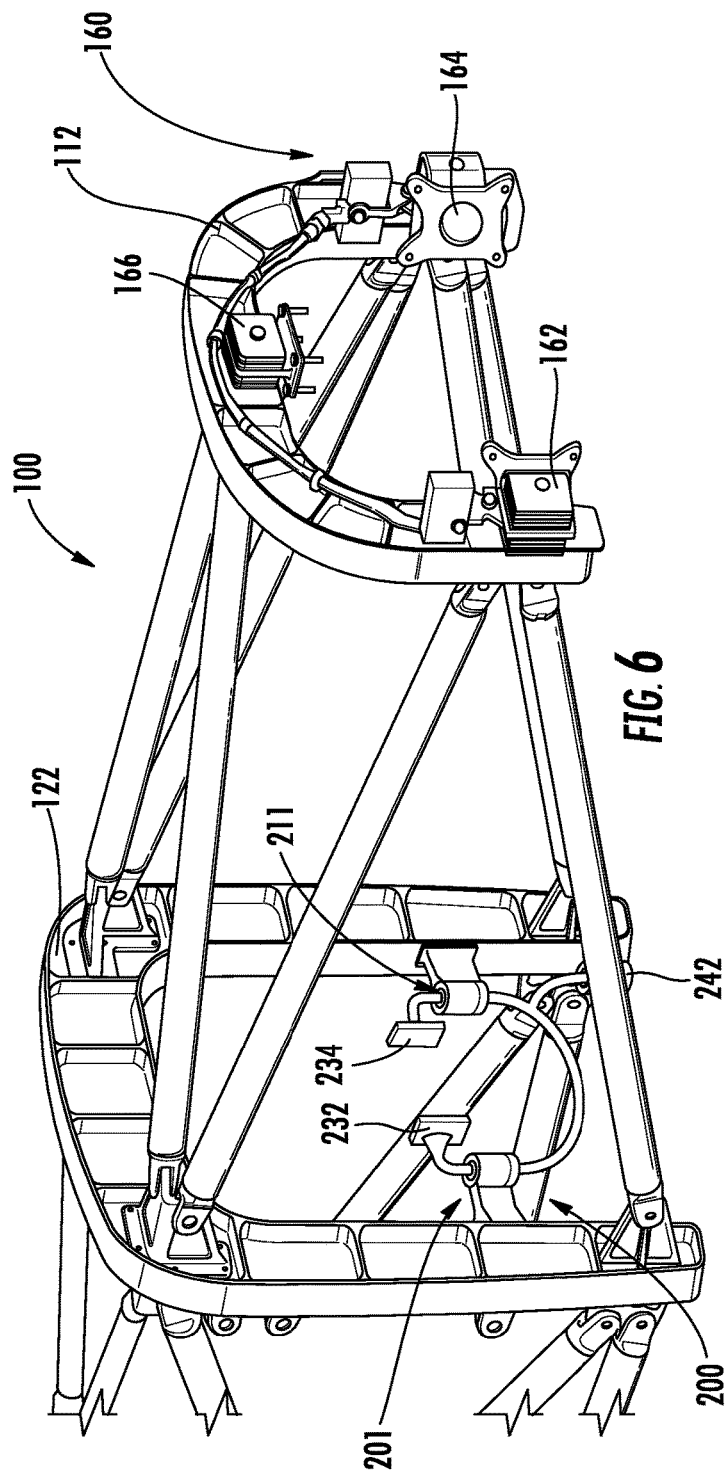

In yet a further embodiment illustrated in FIG. 5, cradle 230 is omitted, and first and second coupling elements 201 and 211 are directly coupled to engine 150. In some embodiments, first strut 202 of first coupling element 201 is pivotably connected to first attachment flange 232, and second strut 212 of second coupling element 211 is pivotably connected to second attachment flange 234. In this configuration, first and second coupling elements 201 and 211 are again configured to react lateral and vertical loads between aft collar 122 of support structure 100 and engine 150 but to allow substantially unrestricted pivoting of engine 150 with respect to aft collar 122 about axis of rotation 155. As will be understood by those having ordinary skill in the art, the degree of required stiffness (e.g., both lateral and vertical) may lead to the selection of one of the mechanical coupling arrangements discussed above versus another. Furthermore, these or any of a variety of other configurations that will be understood in view of the presently disclosed subject matter may likewise arrive at similarly performing systems.

In some alternative embodiments, aft mount system 200 comprises a fluid system to decouple the roll-moment reaction capability from the vertical- and lateral-load reaction capabilities of support structure 100 at aft mounting plane 120. Referring to the embodiment illustrated in FIGS. 6 and 7, first coupling element 201 of aft mount system 200 in such embodiments includes a first fluid coupler 206 configured to couple to the support structure (e.g., mounted to one side of aft collar 122), and second coupling element 211 includes a second fluid coupler 216 that is configured to be spaced apart from first fluid coupler 206 and coupled to the support structure (e.g., mounted to an opposing side of aft collar 122). In some embodiments of such a fluid system, first fluid coupler 206 surrounds a first inner member 207 (e.g., a piston), which is connected to engine 150 (e.g., by first attachment flange 232), and a first fluid chamber 208. Similarly, second fluid coupler 216 surrounds a second inner member 217, which is connected to engine 150 (e.g., by second attachment flange 234), and a second fluid chamber 218. A fluid conduit 240 is connected between first fluid chamber 208 and second fluid chamber 218 to form a substantially closed system that is filled with a substantially incompressible fluid (e.g, a silicone fluid, glycol, or polyglycol) but that allows the fluid to pass between the fluid chambers. In some embodiments, a compliance device 242 is provided in communication with fluid conduit 240 between first and second fluid chambers 208 and 218 to allow for expansion or contraction of the fluid caused by changes in operating conditions (e.g., temperature, pressure, etc.). Alternatively or in addition, in some embodiments, the total volume and/or type of fluid used in the fluid system are selected based on the coefficient of thermal expansion of the fluid and the expected operating conditions.

Figure 7:
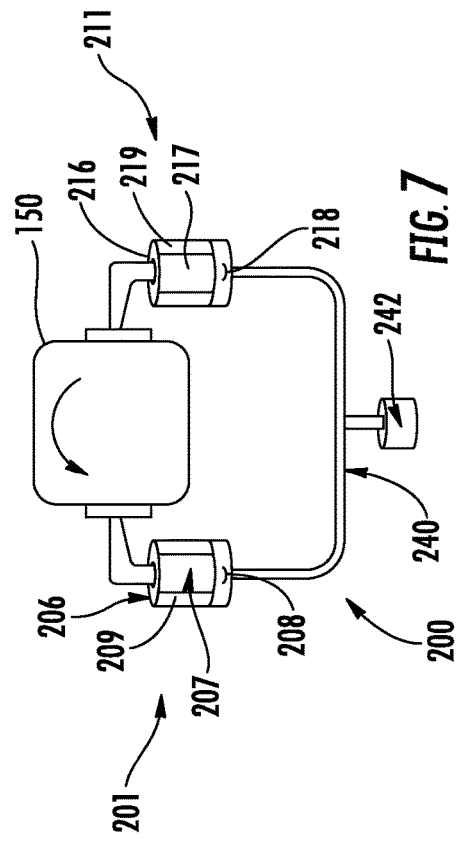
FIG. 7 is a schematic view of an anti-torque aft-mount of an engine mounting system according to an embodiment of the presently disclosed subject matter.

In this arrangement, which is illustrated in FIG. 7, first and second fluid couplers 206 and 216 are substantially fixed in place with respect to support structure 100, whereas first and second inner members 207 and 217 are moveable in coordination with any movement of engine 150 with respect to support structure 100. As a result, the relative movement of first and second inner members 207 and 217 with respect to first and second fluid couplers 206 and 216, respectively, results in changes in the respective volumes of first and second fluid chambers 208 and 218. In this way, when one of first or second inner members 207 or 217 is loaded (e.g., by an applied moment), fluid in the respective one of first and second fluid chambers 208 and 218 is compressed and flows towards the other fluid chamber, thereby forcing the associated inner member in the other fluid chamber to move in the same torsion direction. In situations where these volume changes in first and second fluid chamber 208 and 218 are substantially complementary (e.g., the volume of one expands while the volume of the other decreases), such fluid transfer between first and second fluid chambers 208 and 218 merely redistributes the total fluid volume. This combined effect means that the torque reaction is quite low. On the other hand, when subjected to translation loads, the fluid is compressed in both of first and second fluid chambers 208 and 218 and is not easily offset by redistributing the fluid among the fluid chambers. The resulting stiffness against translation in such a situation is quite high. In comparison to known fluid torque restraint systems, this configuration of aft mount system 200 is thus inversely configured to restrict torque reaction instead of achieving a high degree of torque reaction.

In some embodiments, this stiffness is governed by compliance within the fluid chambers, by a compliant element located within the hydraulic system (e.g., conduit), and/or by a pneumatic arrangement. In some embodiments, first fluid coupler 206 further contains a first elastomeric element 209 (e.g., a molded annular elastomer section) that resiliently couples first inner member 207 to first fluid coupler 206, and second fluid coupler 216 further contains a second elastomeric element 219 that resiliently couples second inner member 217 to second fluid coupler 216. In this configuration, the properties of first and second elastomer elements 209 and 219 are selected to control the stiffness of the translational dampening.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims.

What is claimed is:

1. An aircraft engine mount system for attaching an aft portion of an aircraft engine to an aircraft, the aircraft engine mount comprising:
   a support structure capable of being attached to the aircraft, the support structure further comprising:
   two or more coupling elements capable of pivotably coupling an aft portion of the aircraft engine to the support structure, the two or more coupling elements extending radially inward towards a focal point along an axis of rotation of the aircraft engine;
   wherein the two or more coupling elements react forces generated in a vertical direction and in a lateral direction transverse to the aircraft engine; and
   wherein the two or more coupling elements are capable of allowing substantially unrestricted rotation of the aircraft engine with respect to the support structure about the axis of rotation of the aircraft engine and are capable of decoupling a roll-moment reaction from the vertical load and the lateral load reaction of the support structure at an aft mounting plane.

2. The aircraft engine mount system of claim 1, wherein each of the two or more coupling elements is a strut pivotably coupled to the support structure and capable of being coupled to the aft portion of the aircraft engine, wherein each of the struts is pivotable in response to a rotation of the aircraft engine about the axis of rotation.

3. The aircraft engine mount system of claim 2, wherein each of the struts comprise a flexible element configured to accommodate a change of a length of a respective at least one of the struts when the aircraft engine is moved relative to the support structure.

4. The aircraft engine mount system of claim 2, wherein each of the struts is oriented substantially along lines between one or more positions on the support structure and the focal point located along the axis of rotation of the aircraft engine.

5. The aircraft engine mount system of claim 1, comprising a cradle capable of being connected to the aft portion of the aircraft engine, wherein the two or more coupling elements are pivotably coupled to the cradle.

6. The aircraft engine mount system of claim 5, wherein the cradle comprises an expansion joint configured to accommodate thermal expansion of the aircraft engine.

7. The aircraft engine mount system of claim 1, wherein each of the two or more coupling elements are pivotably attached to an attachment flange, the attachment flange being mountable to the aircraft engine.

8. An aircraft engine mount system capable of coupling an aircraft engine of to an aircraft, the aircraft engine mount system comprising:
   a support structure capable of being attached to the aircraft, the support structure further comprising:
   a forward mount comprising two or more forward coupling elements capable of coupling a forward portion of the aircraft engine to the support structure;
   an aft mount comprising two or more aft coupling elements capable of pivotably coupling an aft portion of the aircraft engine to the support structure, the two or more coupling elements extending radially inward towards a focal point along an axis of rotation of the aircraft engine;
   wherein the two or more aft coupling elements are capable of allowing substantially unrestricted rotation of the aircraft engine with respect to the support structure about the axis of rotation of the aircraft engine and are capable of decoupling a roll-moment reaction from the vertical load and the lateral load reaction of the support structure at an aft mounting plane; and
   wherein the forward mount reacts greater than 85% of torque generated by the aircraft engine.

9. The aircraft engine mount system of claim 8, wherein each of the two or more aft coupling elements is a strut pivotably coupled to the support structure and capable of being coupled to the aft portion of the aircraft engine, wherein each of the struts is pivotable in response to rotation of the aircraft engine about the axis of rotation.

10. The aircraft engine mount system of claim 9, wherein each of the struts comprises a flexible element configured to accommodate a change of a length of a respective at least one of the struts when the aircraft engine is moved relative to the support structure.

11. The aircraft engine mount system of claim 9, wherein each of the struts is oriented along a respective line between one or more positions on the support structure and a focal point located along the axis of rotation of the aircraft engine.

12. The aircraft engine mount system of claim 9, comprising a cradle capable of being connected to the aft portion of the aircraft engine, wherein the two or more aft coupling elements are pivotably coupled to the cradle.

13. A method for coupling an aft portion of an aircraft engine to a support structure coupled to an aircraft, the method comprising:
   pivotably coupling two or more coupling elements of the aircraft engine mount system between the aft portion of the aircraft engine and the support structure, the two or more coupling elements extending radially inward towards a focal point along an axis of rotation of the aircraft engine;
   wherein the two or more coupling elements react forces generated in a vertical direction and in a lateral direction transverse to the aircraft engine; and
   wherein the two or more coupling elements allow substantially unrestricted rotation of the aircraft engine with respect to the support structure about the axis of rotation of the aircraft engine and decouple a roll-moment reaction from the vertical load and the lateral load reaction of the support structure at an aft mounting plane.

14. The method of claim 13, wherein each of the two or more coupling elements is a strut, and wherein coupling the two or more coupling elements between the aft portion of the aircraft engine and the support structure comprises pivotably coupling two or more struts to the support structure and to the aft portion of the aircraft engine, wherein each of the two or more struts pivots in response to rotation of the aircraft engine about the axis of rotation.

15. The method of claim 14, wherein pivotably coupling two or more struts to the support structure and to the aft portion of the aircraft engine comprises accommodating a change of a length of each of the two or more struts when the aircraft engine is moved relative to the support structure.

16. The method of claim 14, wherein pivotably coupling two or more struts to the support structure and to the aft portion of the aircraft engine comprises orienting each of the two or more struts along a respective line between one or more positions on the support structure and the focal point located along the axis of rotation of the aircraft engine.

17. The method of claim 14, wherein pivotably coupling two or more struts to the aft portion of the aircraft engine comprises:
   connecting a cradle to the aft portion of the aircraft engine; and
   pivotably coupling the two or more coupling elements to the cradle.

* * * * *